(12) United States Patent
Huang

(10) Patent No.: US 6,786,124 B1
(45) Date of Patent: Sep. 7, 2004

(54) MARKING DEVICE FOR A TABLE SAW

(76) Inventor: Sung Shan Yin Huang, No. 159, Sec. 3, Yung Ping Rd., Tai Ping City, Taichung Hsien (TW)

( * ) Notice: Subject to any disclaimer, the term of this patent is extended or adjusted under 35 U.S.C. 154(b) by 0 days.

(21) Appl. No.: 10/368,550

(22) Filed: Feb. 20, 2003

(51) Int. Cl.[7] .......................... B27B 27/00; B27B 13/16; B26D 7/00
(52) U.S. Cl. .......................... 83/520; 83/522.15; 83/820
(58) Field of Search ............................... 83/520, 522.15, 83/820

(56) References Cited

U.S. PATENT DOCUMENTS

| | | | | |
|---|---|---|---|---|
| 1,388,110 A | * | 8/1921 | Hallock | 83/520 X |
| 2,307,820 A | * | 1/1943 | Butters | 83/520 |
| 2,440,950 A | * | 5/1948 | Hill | 83/520 X |
| 2,492,824 A | * | 12/1949 | Ahrndt et al. | 83/520 X |
| 2,806,492 A | * | 9/1957 | Becker | 83/520 |
| 2,913,926 A | * | 11/1959 | Hammond | 83/520 X |
| 3,302,670 A | * | 2/1967 | Yumino | 83/802 |
| 5,038,481 A | * | 8/1991 | Smith | 30/392 |
| 5,375,495 A | * | 12/1994 | Bosten et al. | 83/520 |
| 2003/0233921 A1 | * | 12/2003 | Garcia et al. | 83/520 |

* cited by examiner

Primary Examiner—Charles Goodman
(74) Attorney, Agent, or Firm—Rosenberg, Klein & Lee

(57) ABSTRACT

A marking device for a table saw includes a laser radiating device mounted to align with a saw blade of the table saw. The laser radiating device emits a light plane aligning with a saw plane of the table saw and marking a light straight line on the top surface of the work piece.

5 Claims, 4 Drawing Sheets

MARKING DEVICE FOR A TABLE SAW

BACKGROUND OF THE INVENTION

1. Field of the Invention

The present invention relates to a marking device, and more particularly to a marking device for a table saw.

2. Description of Related Art

A conventional table saw in accordance with the prior art shown in FIG. 4 comprises a worktable (81) and a rip fence guide (83) movable mounted on the worktable (81). The rip fence guide (83) has a datum plane (not numbered) parallel to a saw blade (82) of the table saw. Consequently, a work piece only needs to abut the datum plane and straightly moved, and the worker can straightly saw the work piece.

Another conventional table saw comprises a miter gauge rotatably mounted on the worktable of the table saw for worker to saw the work piece along an inclined line relative to a datum plane of the work piece.

In using the above conventional table saws, the worker must previously manufacture a datum plane on the work piece to abut the rip fence guide or the miter gauge for straightly sawing the work piece. However, the worker cannot previously manufacture datum plane when the work piece is incapable or should not to form a datum plane such that the rip fence guide or the miter gauge is useless to a straight sawing. Consequently, the worker needs to previously draw a straight line on a top surface of the work piece to promote the accuracy of the saw work. However, the sawdust may cover the line during sawing. The worker needs to clean the sawdust during sawing. It is very troublesome and dangerous. Furthermore, it is hard to draw a line on the top surface of the work piece when the top surface is rough such that the worker easily loses the accuracy of sawing.

The present invention has arisen to mitigate and/or obviate the disadvantages of the conventional table saw.

SUMMARY OF THE INVENTION

The main objective of the present invention is to provide a marking device for a table saw that can accurately mark a straight line on a top surface of a work piece.

To achieve the objective, the marking device in accordance with the present invention comprises a laser radiating device mounted to align with a saw blade of the table saw. The laser radiating device emits a light plane aligning with a saw plane of the table saw and marking a light straight line on the top surface of the work piece.

Further benefits and advantages of the present invention will become apparent after a careful reading of the detailed description with appropriate reference to the accompanying drawings.

DETAILED DESCRIPTION OF THE INVENTION

Figure 1:
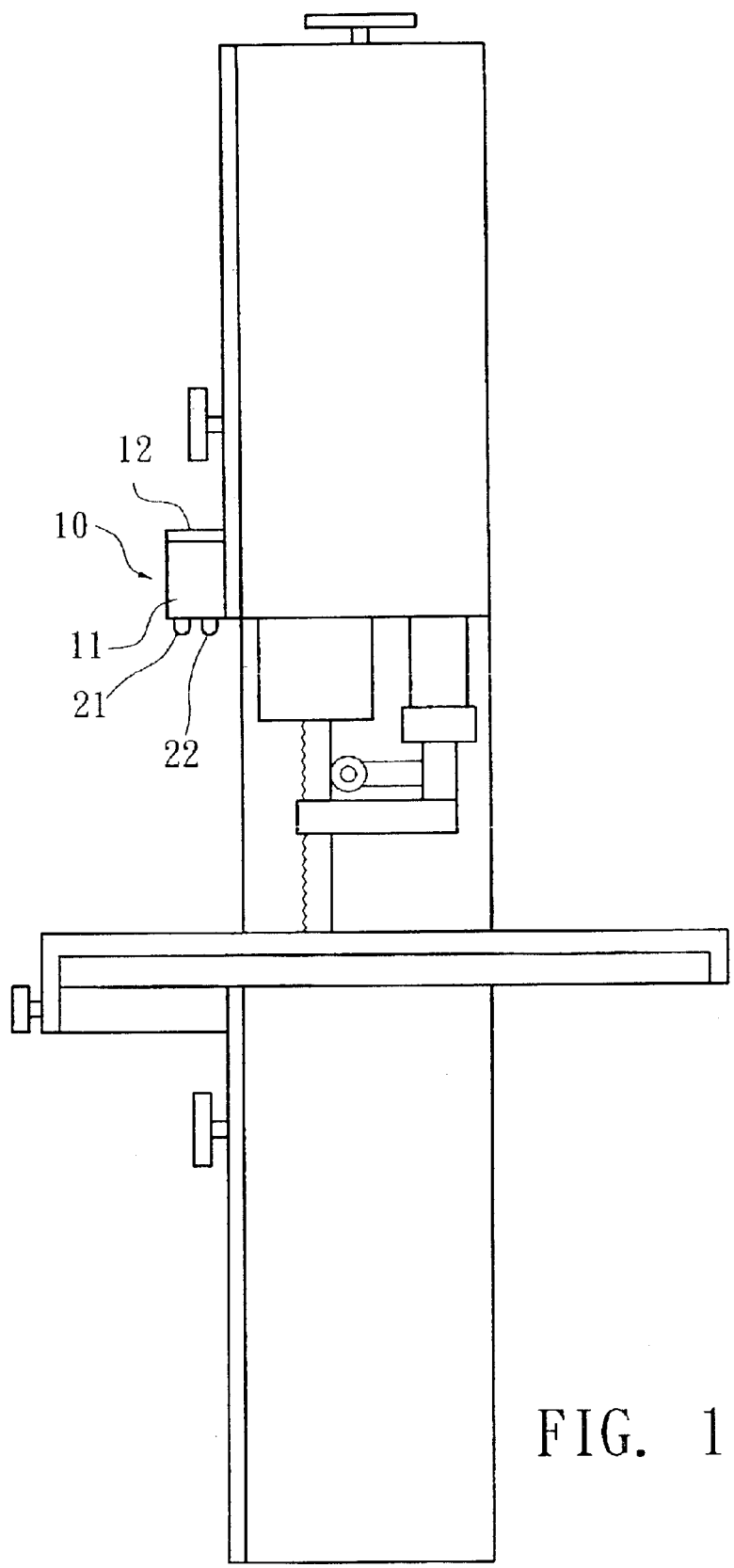
FIG. 1 is a schematic side plan view of a marking device for a table saw in accordance with the present invention.
Figure 2:
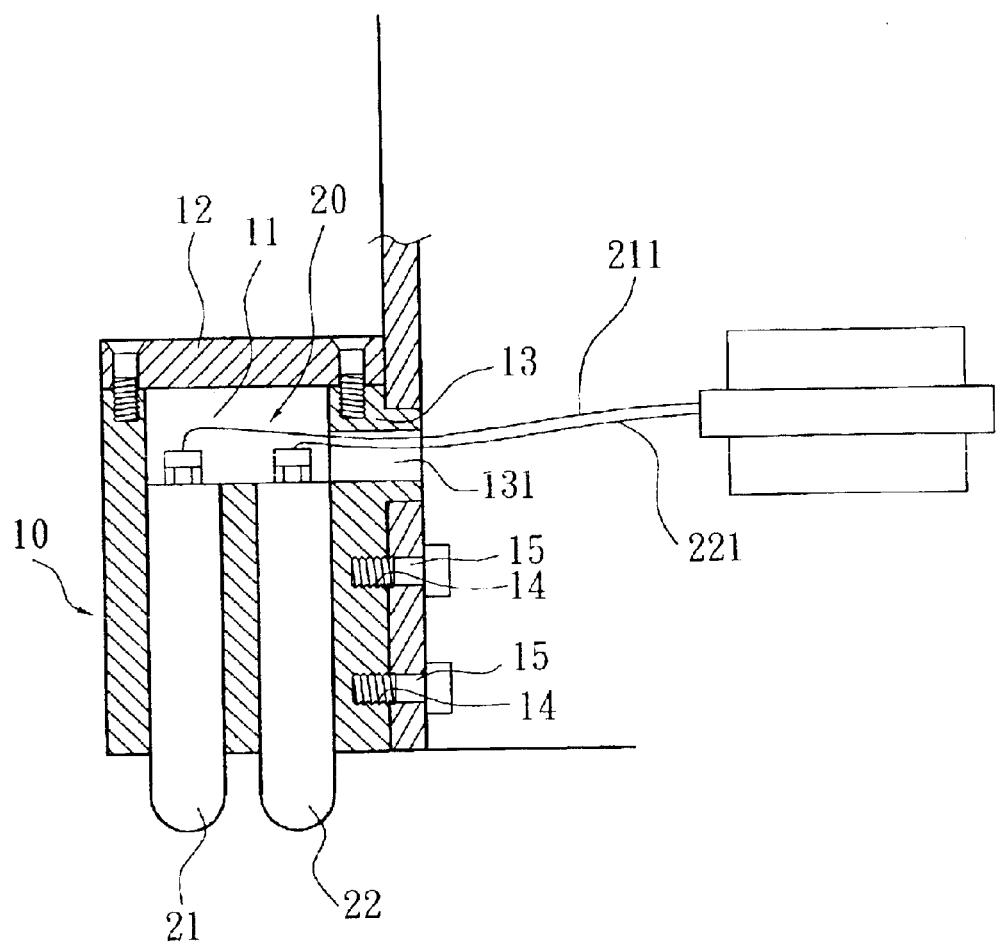
FIG. 2 is a cross sectional view of the marking device for a table saw in FIG. 1.

Referring to the drawings and initially to FIGS. 1 and 2, a marking device for a table saw in accordance with the present invention comprises a casing (10) adapted to be attached to the table saw and an optics assembly (20) mounted in the casino (10).

The casing (10) comprises a cavity (11) defined therein for receiving the optics assembly (20) and a protrusion (13) extending from the casing (10) and penetrating through a panel (not numbered) of the table saw. A through hole (131) is defined in the protrusion (13) and extends through the protrusion (13). At least one threaded hole (14) is defined the casing (10) neat the protrusion (13). In the preferred embodiment of the present invention, the casino (10) includes two threaded holes (14) defined under the protrusion (13). Consequently, two bolts (15) are adapted to extend through the panel of the table saw) and respectively screwed into a corresponding one of the two threaded holes (14) in the casing (10) to hold the casing (10) in place on the panel of the table saw. A cover (12) is detachably attached to a top portion of the casing (10) to close the cavity (11) to prevent the optics assembly (20) from being polluted due to the sawdust.

The optics assembly (20) includes a laser radiating device (21) secured in the casing (10). The laser radiating device (21) has a lower end extending through a bottom of the casino (10) and adapted to align with the saw blade of the table saw. The laser radiating device (21) has an upper end electrically connected to a power supplier (not numbered) in the table saw by a first wire (211). For a better brightness to the worker, the optics assembly (20) further includes a lighting element (22) secured in the casing (10). The lighting element (22) has a lower end extending through the bottom of the casing (10) for lighting the work piece and an upper end electrically connected to the power supplier in the table saw. In the preferred embodiment of the present invention, the lighting element (22) is a light emitting diode (LED) emitting white light and the power supplier is a transformer that outputs 1.5 volt.

Figure 3:
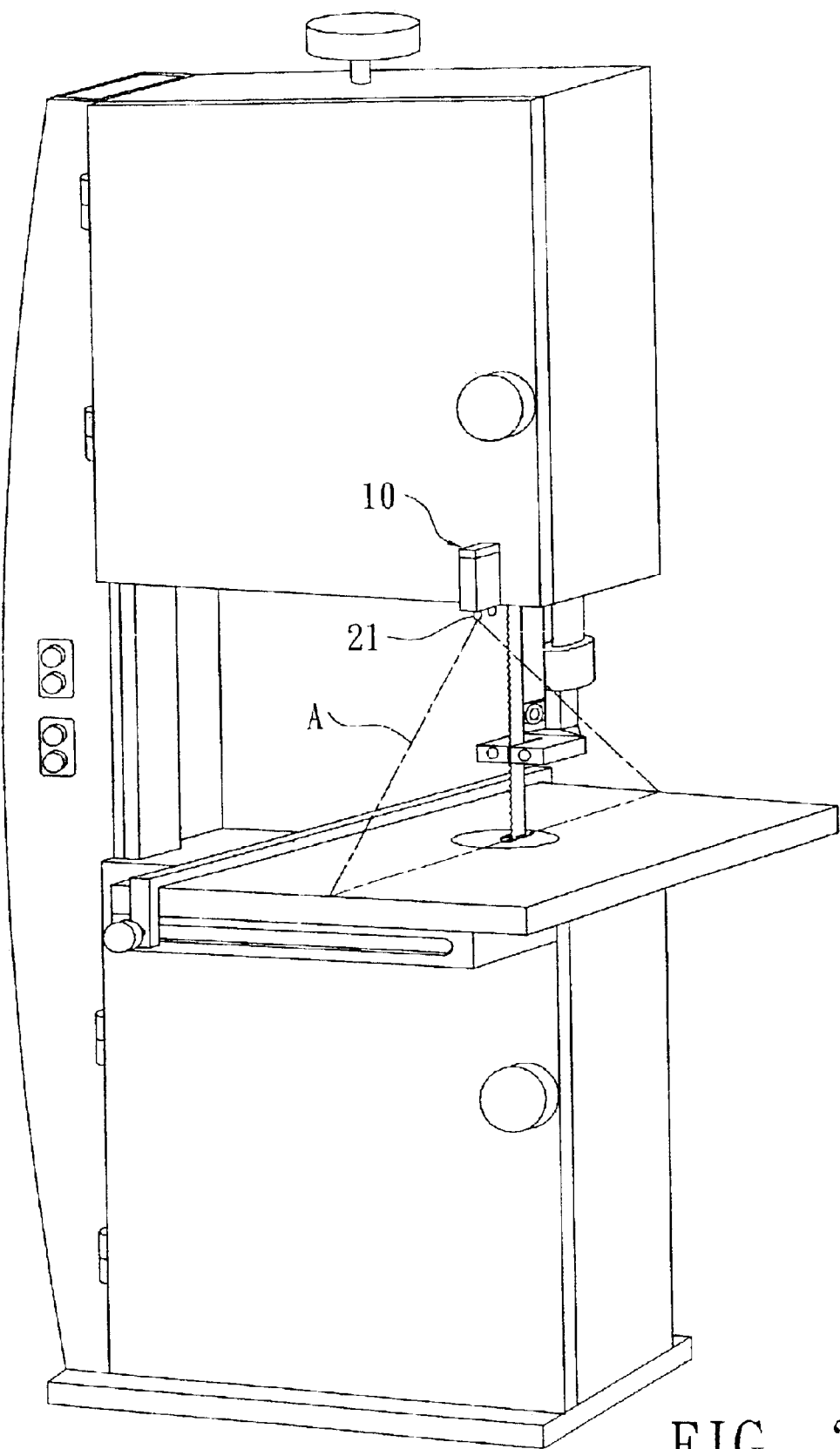
FIG. 3 is a perspective schematic view of the making device for a table saw in FIG. 2.
Figure 4:
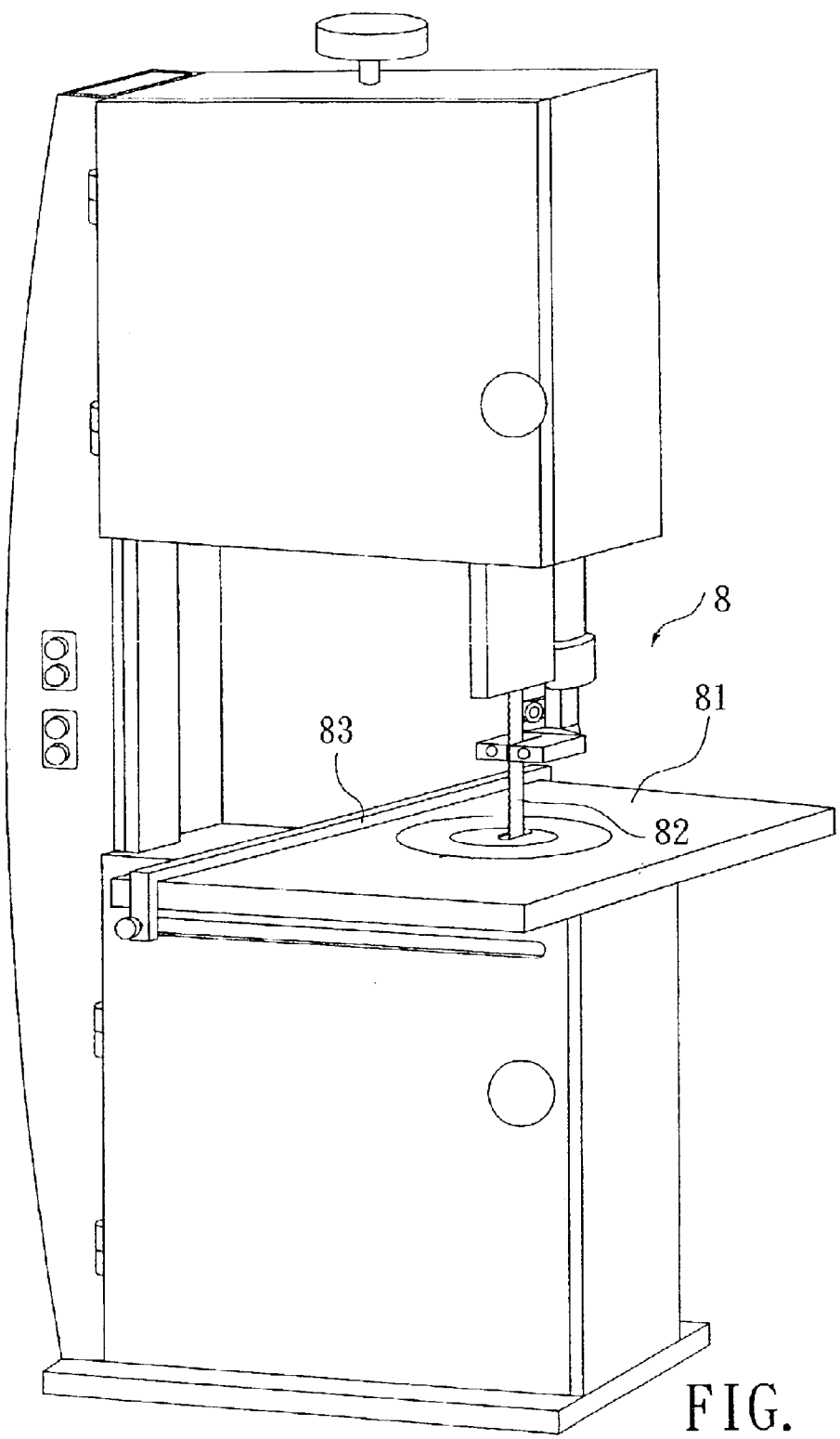
FIG. 4 is a perspective view of a conventional table saw in accordance with the prior art that has no marking device.

With reference to FIG. 3, to operate the present invention, the laser radiating device (21) emits a light plane (A) aligning with a saw plane of the table saw and marking a light straight line on the top surface of the work piece. The worker only needs to align the light straight line, a starting point and a terminal point of a sawing route of the table saw and easily saws the work piece in a accurate straight line even the work piece has a rough top surface. Furthermore, the laser almost not disperses such that the marked light straight line is always accurate no matter what size the work piece has.

As described above, the marking device for a table saw in accordance with the present invention has the following advantages.

1. The light straight line marked by the present invention is accurate and never covered by the sawdust during sawing.

2. The worker can easily saw the work piece in an accurate straight line even the work piece has a rough top surface.

3. The laser almost not disperses such that the marked light to straight line is always accurate no matter what size the work piece has.

Although the invention has been explained in relation to its preferred embodiment, it is to be understood that many other possible modifications and variations can be made without departing from the spirit and scope of the invention as hereinafter claimed.

What is claimed is:

1. A marking device for a table saw comprising:

a casing adapted to be attached to a panel of the table saw and including:

a cavity defined in the casing;

a protrusion extending from the casing and adapted to penetrate the panel of the table saw;

a through hole defined in and extending through the protrusion;

at least one threaded hole defined in the casing and adapted to face the panel of the table saw such that at least one bolt is adapted to extend through the panel and screwed into the at least one threaded hole to hold the casing in place; and a cover attached to a top portion of the casing to close the cavity to prevent sawdust form floating into the casing; and an optics assembly mounted in the casing and including a laser radiating device secured in the casing, the laser radiating device having a lower end extending through a bottom of the casing and adapted to align with a saw blade of the table for emitting a light plane that is adapted to align with a saw plane of the table saw, the laser radiating device having an upper end electrically connected to a power supplier that is adapted to be mounted in the table saw, a lighting element secured in the casing, the lighting element having a lower end extending through the bottom of the casing for illumination of an area of the table saw with the illumination overlapping the light plane of the laser radiating device, and an upper end electrically connected to the power supplier.

2. The marking device as claimed in claim 1, wherein the power supplier is a transformer and outputs 1.5 volt.

3. The marking device as claimed in claim 1, wherein the lighting element is a light emitting diode (LED) that emitting white light.

4. The marking device as claimed in claim 1, wherein the power supplier is a transformer and outputs 1.5 volt.

5. The marking device as claimed in claim 3, wherein the power supplier is a transformer and outputs 1.5 volt.

* * * * *